United States Patent [19]

Fang et al.

[11] Patent Number: 5,682,520
[45] Date of Patent: Oct. 28, 1997

[54] ARRAY PROCESSOR FOR MORPHOLOGICAL IMAGE PROCESSING

[75] Inventors: Wai-Chi Fang, San Marino; Timothy J. Shaw, Montrose; Jeffrey W. Yu, Northridge, all of Calif.

[73] Assignee: California Institute of Technology, Pasadena, Calif.

[21] Appl. No.: 601,696

[22] Filed: Feb. 15, 1996

Related U.S. Application Data

[63] Continuation of Ser. No. 124,953, Sep. 20, 1993, abandoned.
[51] Int. Cl.$^6$ .................................................. G06K 9/40
[52] U.S. Cl. ................................. 395/502; 395/955
[58] Field of Search ........................... 395/119, 120, 395/127, 955, 502

[56] References Cited

U.S. PATENT DOCUMENTS

| | | | |
|---|---|---|---|
| 4,541,116 | 9/1985 | Lougheed | 382/49 |
| 5,237,626 | 8/1993 | Forslund et al. | 382/27 |
| 5,263,096 | 11/1993 | Yu et al. | 382/27 |

Primary Examiner—Mark K. Zimmerman
Assistant Examiner—Rudolph Buchel
Attorney, Agent, or Firm—Blakely, Sokoloff, Taylor & Zafman LLP

[57] ABSTRACT

The array processor includes a grid of individual morphological processing elements formed on a VLSI chip. Each element of the grid includes a photo-detector for directly sensing a pixel of an image projected upon the chip. A signal generated by the photo-detector is sensed by a threshold circuit which outputs a binary value having a value depending upon the intensity of the light detector by the photo-detector. Each element also includes morphological processing circuitry for manipulating the binary value received from the threshold detector in accordance with predetermined morphological processing operations and in accordance with binary values received from adjacent processing elements. After modification of the binary value by application of one or more morphological processing operations, the binary value of each processing element is used to control a respective LCD element for displaying a pixel of a modified image. In this manner, all pixels of a modified image are output in parallel. By implementing the photo-detector, morphological processing circuitry and LCD output all on a VLSI chip, the array processor is capable is achieving real-time processing of two-dimensional images. An embodiment is also described wherein electrical output, rather than an LCD output, is provided.

11 Claims, 6 Drawing Sheets

ARRAY PROCESSOR FOR MORPHOLOGICAL IMAGE PROCESSING

This is a Continuation application of application Ser. No. 08/124,953, filed Sep. 20, 1993, now abandoned.

BACKGROUND OF THE INVENTION

1. Origin of the Invention

The invention described herein was made in the performance of work under a NASA contract, and is subject to the provisions of Public Law 96-517 (35 USC §202) in which the Contractor has elected to retain title.

2. Technical Field

The present invention generally relates to morphological image processing and in particular relates to hardware systems for performing or facilitating morphological image processing.

3. Background Art

Morphological image processing relates to a set of techniques for processing, typically, two-dimensional images to extract certain image components. The image is digitized, then individual pixels of the image are selectively modified in accordance with a set of morphological processing tools or operators to modify the original image. In this regard, operations are performed on each individual pixel in accordance with the values of adjacent pixels. Examples of morphological processing operators include dilation, erosion, opening, closing and skeletonization operators. Often, a sequence of morphological processing operations are performed on the image to yield a desired modification of the image. Morphological processing, in general, and the above-listed morphological processing operators, in particular, are well known to those skilled in the art, and will not be described in detail herein.

Numerous systems, methods, and techniques have been developed to facilitate morphological processing. Typically, the input image, once digitized, is stored into a computer, which operates to modify the stored image in accordance with preprogrammed morphological processing operators. A morphological image processing language (MIPL) has been developed to facilitate sophisticated morphological processing.

Although a system having a host computer for storing and modifying digital images provides a powerful tool for performing morphological processing, such a system is not ideal for certain applications. In particular, where realtime morphological image processing is required, a conventional programmed computer does not provide for sufficient processing speed. To enhance overall processing speed, it would be desirable to provide a dedicated hardware system which operates directly on a received image, without requiring storage or manipulation within a programmable computer.

SUMMARY OF THE INVENTION

A general object of the invention is to provide an improved system for morphological image processing. A particular object of the invention is to provide a hardware-based system which performs morphological image processing on a received image in real-time.

These and other objects of the invention are achieved by the provision of a morphological array processor having a plurality of processing elements. Each of the processing elements includes a photo-detector means for detecting light and a morphological processing means for storing a value representative of a an amount of light detected by the photo-detector and for performing morphological processing of the value in accordance with pre-selected morphological operations and in accordance with the values of adjacent processing elements. An output means is also provided for outputting signals representative of the image, after the completion of morphological processing.

In a preferred embodiment the plurality of processing elements are formed on a single VLSI chip. The photo-detector means is a photo-diode which detects light from an input image and generates a signal in response thereto. A threshold detection means is provided which receives the signal from the photo-detector and generates a binary signal having a first value if the signal exceeds a predetermined threshold and a second value if the signal does not exceed the threshold. The morphological processing means is a processing circuit which stores the binary signal received from the threshold detection circuit, compares the binary value with similar binary values received from adjacent processing elements and selectively modifies the stored binary value in accordance with a sequence of received morphological processing commands. In one embodiment, the commands are received from a host computer. In another, a pre-determined sequence of commands are stored in a PROM on the VLSI chip.

To facilitate parallel output of each binary value or pixel of the processed image, the output means is preferably an optical output means having a single liquid crystal diode (LCD) element connected to each processing element. After a set of morphological processing operations, a resulting binary value stored by the processing element is used to control the respective LCD element, thus providing an optical output for the pixel. In this manner, all binary values are output in parallel. Alternatively, electrical signal output may provide either parallel or sequential output of the binary values of the processing elements.

The invention is also embodied as a method for performing morphological processing of an image.

In its various embodiments, the invention provides an efficient and relatively inexpensive method or apparatus for performing high speed, real-time morphological processing of an image. As such, the invention achieves the objectives listed above. Other objects, features, and advantages of the invention will be apparent from the detailed description of the invention set forth below.

DETAILED DESCRIPTION OF THE INVENTION

Figure 1:
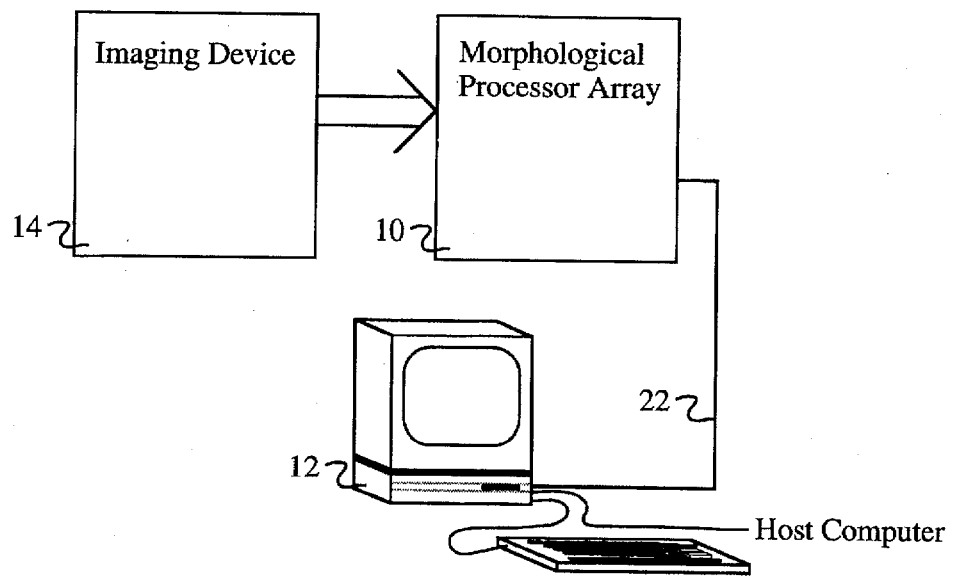
FIG. 1 is a block diagram illustrating a morphological processing system having a VLSI focal plane morphological processing chip, configured in accordance with a preferred embodiment of the invention.

Referring to the Figures, illustrative and preferred embodiments of the invention will now be described. FIG. 1 illustrates a morphological processing system 8 having a VLSI focal-plane morphological processing chip 10 connected to a host computer 12. An imaging device 14 projects a two-dimensional image onto a focal plane (not shown). Processing chip 10 includes optical input elements for detecting the image projected by imaging device 14. Chip 10 is positioned along the focal plane of imaging device 14 such that chip 10 receives a focused two-dimensional image.

Processing chip 10, in connection with host computer 12, stores and processes the projected image in accordance with morphological processing techniques to generate a digitized, modified representation of the projected image. The digitized, modified image is output to host computer 12 for possible storage or post-processing therein. In the embodiment of FIG. 1, the digitized image is output electronically to host computer 12. In an alternative embodiment, described below, processing chip 10 includes individual LCD elements for providing direct optical output of the modified image. Optical imaging device 14 may be configured in accordance with conventional techniques, and, as such, will not be described in further detail herein.

Processing chip 10 includes generalized morphological processing circuitry for performing operations in response to commands received from host computer 12. Alternatively, processor 10 may include hard-wired circuitry dedicated to performing a particular sequence of morphological operations. In such an embodiment, host computer 12 is provided, if at all, only to store a modified image and perform any needed post processing of the image.

Figure 2:
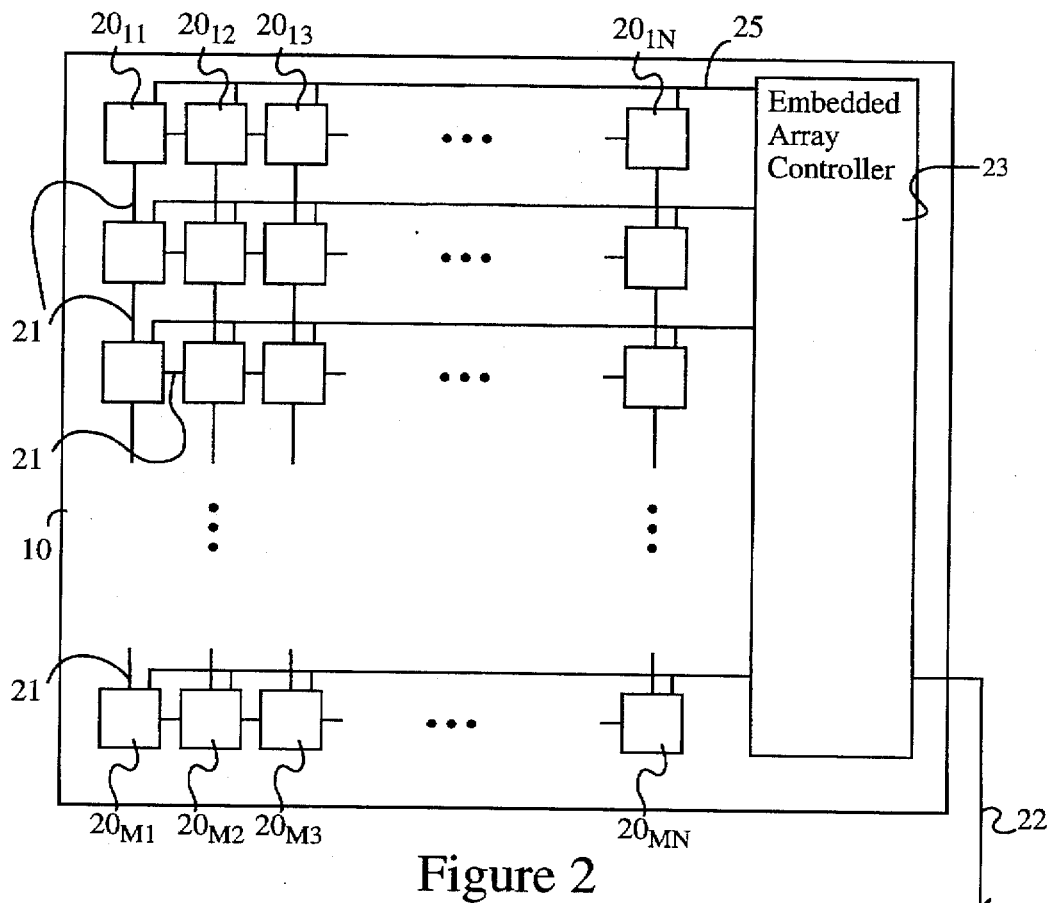
FIG. 2 is a block diagram illustrating the morphological processing chip of FIG. 1.

FIG. 2 illustrates morphological processing chip 10 fabricated as a single integrated circuit. As can be seen from FIG. 2, chip 10 includes a matrix or grid of equally-spaced processing elements, generally denoted 20, with individual exemplary elements having subscripts denoting row and column positions, for example $20_{11}$, $20_{21}$, etc. Each processing unit 20 is connected to each immediately adjacent neighbor by interconnection lines 21. Interior elements are connected to four adjacent neighbors, generally referred to herein as the north, south, east and west neighbors. Border elements, such as element $20_{12}$ are connected to only three adjacent neighbors. Corner elements, such as $20_{11}$, are connected to only two adjacent elements.

Chip 10 also includes an embedded array controller 23. Connection lines 25 are connected between controller 23 and each of elements 20. Input/output line 22 is also connected for transmitting command signals from host computer 12 (FIG. 1) to controller 23. Input/output line 22 also provides an electrical output for transmitting pixel information, generated by the individual processing elements to the host computer 12 (FIG. 1). As can be appreciated, input/output line 22 and connection lines 25 may, depending upon the implementation, each actually comprise several separate lines and may be implemented as bus lines with appropriate bus control devices provided both on chip 10 and host computer 12. If chip 10 is configured to provide optical output from each processing element, then connection lines 25 and output line 22 need not provide for pixel output information. However, even when direct optical output is provided, redundant electrical output is preferred to allow for verification that the optical output means is functioning properly.

Controller 23 receives command signals from host computer 12 (FIG. 1), decodes the signals, if needed, and transmits the signals to each of the individual elements 20. In particular, controller 23 is preferably configured to convert signals containing conventional MIPL commands to specific LOAD and SELECT signals (described below) for transmission to individual elements 20. Binary output signals are transmitted from the individual pixels through controller 23 to host computer 12 (FIG. 1.)

Figure 3:
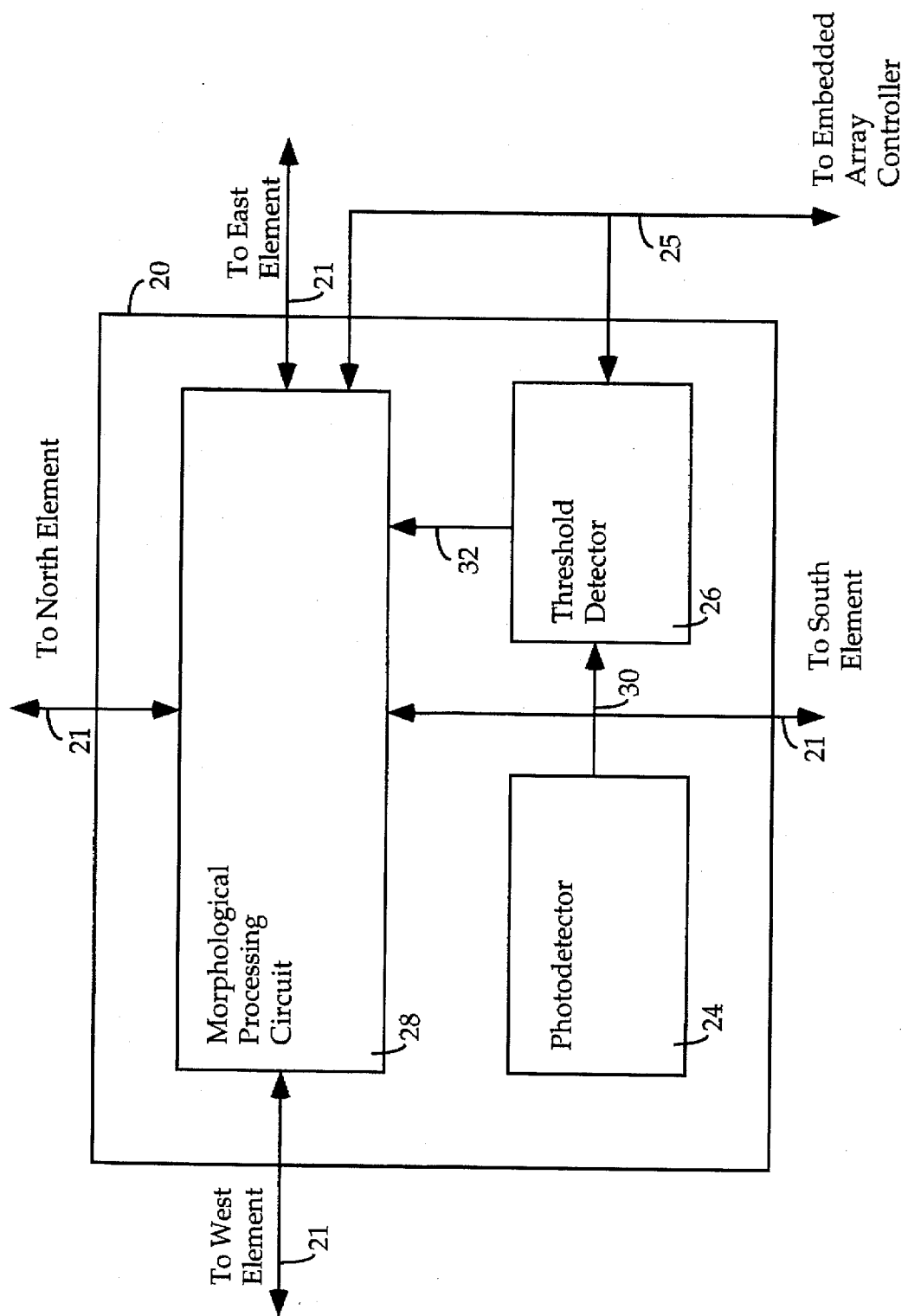
FIG. 3 is a block diagram illustrating an individual processing element of the morphological processing chip of FIG. 2.

FIG. 3 illustrates an individual exemplary processing element 20. Processing element 20 includes a photo-detector 24, a threshold detection circuit 26 and a morphological processing circuit 28. Photo-detector 24 receives light projected by imaging device 14 (FIG. 1) and generates an electrical signal in response to an intensity value of the detected light. The photo-detector can use an NPN parasitic photo transistor (not shown) fabricated using standard MOSIS techniques on the integrated circuit. Such a photo-detector provides a linear response over a wide range of optical input. The threshold detector may use a cascode mirror configuration with an external current reference such that the optical threshold of the photo-detector may be set externally using a reference pin (not shown) on the integrated circuit or using signals received along line 25 from controller 23 (FIG. 2.) The electrical signal is transmitted to threshold detection circuit 26 along a line 30.

Threshold detection circuit 26 determines whether the signal received along line 30 from photo-detector 24 exceeds a pre-selected threshold level. The pre-selected threshold level may either be hardwired into threshold detection circuit 26 or preferably received from host computer 12 (FIG. 1) through controller 23 and transmitted to individual elements 20 along lines 25 (FIG. 2). By providing for receipt of the threshold level from the host computer, the threshold level can be modified in accordance with particular applications. Threshold detection circuit 26 outputs a first signal along a connection line 32, if the detected light is below the threshold level and a second signal if the detected light is above the threshold level. As such, threshold detection circuit 26 effectively operates as a binary digitizer. Electrical signals transmitted along line 32 are generally referred to herein as binary signals.

Thus, photo-detector 24 and threshold detection circuit 26 together operate to detect a single pixel of the input image and output a binary signal in response thereto. With each of the processing elements containing a photo-detector, the overall image is effectively digitized, yielding a set of binary values representative of the intensity level of the image at each of a plurality of pixel locations.

The binary signal transmitted along line 32 is received by morphological processing circuit 28 which stores the binary value in a conventional storage device such as a single bit storage register or flip-flop. Processing circuit 28 also receives binary values from each of the neighbor processing elements along connection lines 21. As will be described more fully below, processing element 28 compares the various binary values in accordance with selected morphological processing operations and modifies the binary values stored therein.

In the embodiment illustrated in FIG. 3, the binary value, once modified, is output along line 25 to controller 23, then along input/output line 22 to the host computer (FIG. 1) for subsequent display or host processing. However, in an alternative embodiment, individual values are shifted out of the elements one column at a time. As such, the binary values may be transferred from one adjacent element to another within each column. The values from all elements of each column are then transmitted by means, not shown, to controller 23.

In the embodiment of FIG. 3, processing circuit 28 is a general morphological processing circuit which receives commands from the host computer through controller 23 and performs bit manipulations in accordance with those commands and in accordance with the binary values received from the threshold detection circuit 26 and from adjacent processing elements. Typically, a sequence of preprogrammed operations are performed prior to outputting a final binary value.

Each of the processing elements of chip 10 is preferably identical in configuration. Identical processing commands are sent to each element during each iteration of the overall morphological processing. However, since each different processing element within chip 10 initially receives a different intensity of light and thereby stores differing binary values, the result of each processing step differs from pixel to pixel. After completion of the sequence of operations, the binary values stored in the entire set of processing elements defines a modified digitized image. The specific manner by which the image is modified depends upon the particular sequence of input commands, and may, for example, result in a skeletonization of an input image.

Figure 4:
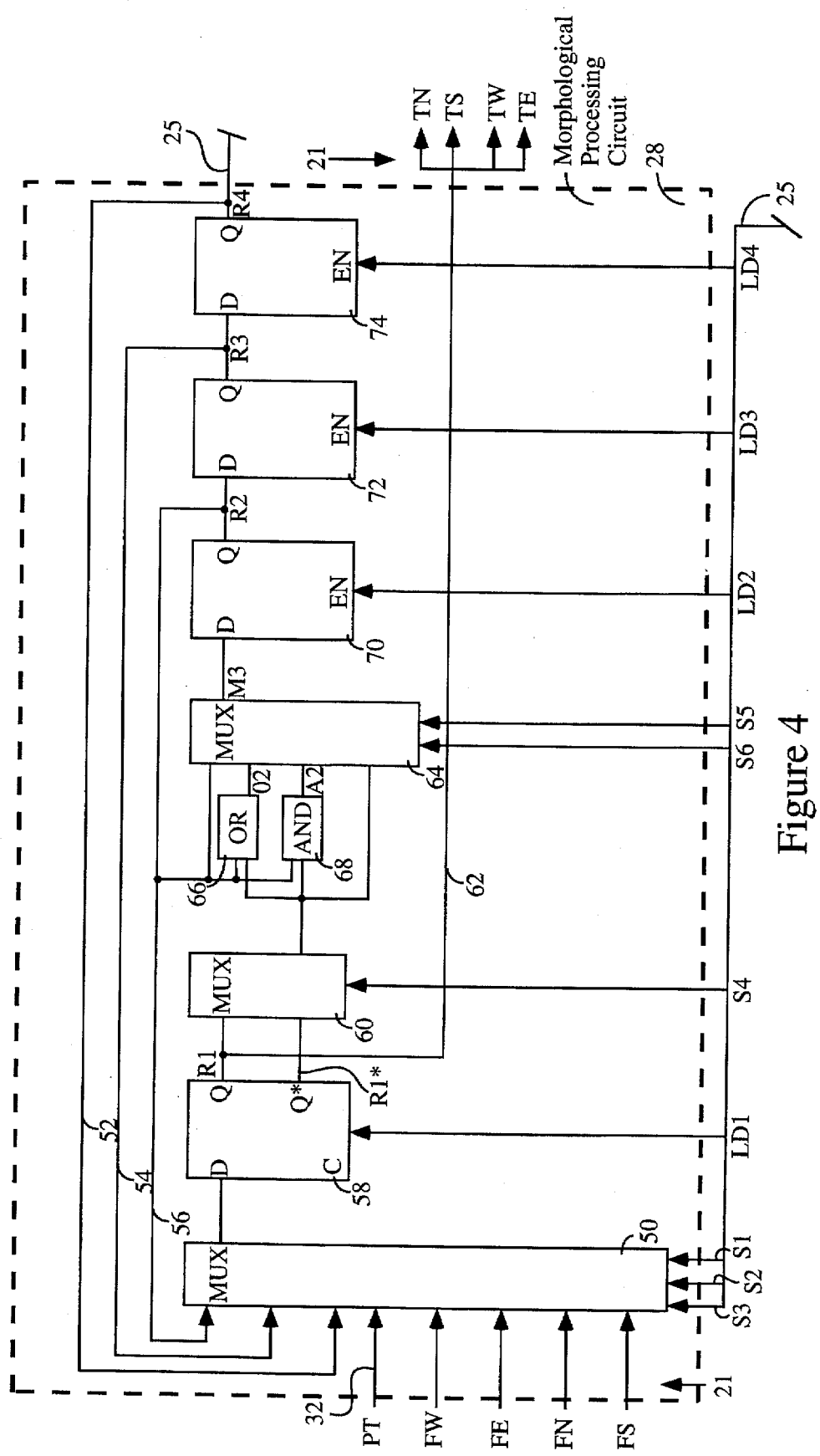
FIG. 4 is a block diagram illustrating the logic design of a morphological processing circuit of the element of FIG. 3.

FIG. 4 illustrates the logic design of each processing circuit 28. Each processing element 28 receives four LOAD signals LD1, LD2, LD3 and LD4 from controller 23 along line 25. Also received along line 25 are six SELECT signals, S1, S2, S3, S4, S5 and S6. As noted above, the LOAD and SELECT signals are preferably generated by controller 23 in response to MIPL signals received from host computer 12 (FIG. 1.) Binary values are received from each of the adjacent processing elements along lines 21. In FIG. 4 the binary values are represented as FS, FN, FE and FW, i.e., "From South", "From North", etc. Finally, the processing element also receives a binary value "PT" from the threshold detection circuit along line 32.

Thus, each processing element receives a total of fifteen input binary signals. For processing elements located on the edges or corners of the chip, one or more of the FS, FN, FE or FW inputs is always inactive.

SELECT signals S1–S3, neighbor signals FS, FN, FE and FW and binary value PT are each fed into a multiplexer 50. Multiplexer 50 also receives three additional input signals along lines 52, 54, and 56 respectively, described below. Multiplexer 50 generates a single binary value M1 in response to the values of the various signals received as input. The single output from multiplexer 50 is fed into the D-input of a clocked, two-output, D-flip-flop 58. A clock input of flip-flop 58 receives the LD1 LOAD signal. Q and Q* outputs of flip-flop 58 (R1 and R1* respectively) are connected into a multiplexer 60. The Q output (R1) of flip-flop 58 (DR1) is also fed along an output line 62 to each adjacent processing element as signals TN, TS, TW and TE, wherein TN refers to "to north", TS refers to "to south", etc.

Multiplexer 60, in addition to receiving outputs from flip-flop 58, receives a SELECT signal S4. A single output (M2) of multiplexer 60 is fed into an OR gate 66 and an AND gate 68. OR gate 66 and AND gate 68 also both receive an output (R2) from a single output D-flip-flop 70 (DR2). An output (O2) of OR gate 66 and an output (A2) of AND gate 68 are connected into inputs of a multiplexer 64.

A fourth input of multiplexer 64 receives signal R2 directly from flip-flop 70. Multiplexer 64 also receives the S5 and S6 SELECT signals.

A single output signal (M3) from multiplexer 64 is received through a D-input of flip-flop 70 which also receives the LD2 LOAD signal through an enable port. A single output (R2) of flip-flop 70 is connected into a D-flip-flop of a second single output flip-flop 72. The Q output (R2) of flip-flop 70 is also connected as one of the inputs to multiplexer 50.

Flip-flop 72, in addition to receiving an output signal from flip-flop 70, receives the LD3 LOAD signal through an enable port. A Q-output (R3) of flip-flop 72 is connected both into multiplexer 50 and into a third single-output flip-flop 74 (DR4). Flip-flop 74 receives the LD4 LOAD signal through an enable input. As with the flip-flop 70 and 72, an output R4 of flip-flop 74 is connected as an input to multiplexer 50. The output of flip-flop 74 is also connected to either input/output line 22 or to a light output device such as an LCD (not shown).

Thus, each processing element includes a set of four flip-flop registers, interconnected to various multiplexers, AND gates and OR gates. The various SELECT and LOAD signals are chosen to achieve particular manipulations of the binary values stored within the various flip-flops. More than one binary storage flip-flop is provided in order to store previous versions of the pixel to facilitate certain morphological processing operations.

The various multiplexers of FIG. 4 will now be described with reference to a set of logic tables which illustrate how certain combinations of input signals yield particular multiplexed output signals. In particular, Table I provides a logic table for multiplexer 50 showing which input signal is output in response to various combinations of input values.

TABLE I

| S3/S2/S1 | OUTPUT |
|---|---|
| 000 | R2 |
| 001 | R3 |
| 010 | R4 |
| 011 | PT |
| 100 | FS |
| 101 | FN |
| 110 | FE |
| 111 | FW |

As can be seen from Table I, if multiplexer 50 receives S3=0, S2=0 and S1=0, multiplexer 50 outputs the R2 signal. As another example, if S3=1, S2=1 and S1=1, then multiplexer 50 outputs the FW signal. In general, the select signals S1, S2 and S3 determine which of the input signals R2–R4, PT, FS, FN, FE and FW is passed to the output of multiplexer 50. Thus, by selectively controlling the values of S1, S2 and S3, any one of the eight input signals to multiplexer 50 may be passed to the output of the multiplexer.

Tables II and III provide logic tables for multiplexers 60 and 64 respectively. As with Table I, Tables II and III indicate the input signal is passed to an output, based on particular combinations of select signals.

TABLE II

| S4 | OUTPUT |
|---|---|
| 0 | R1 |
| 1 | R1* |

TABLE III

| S6/S5 | OUTPUT |
|---|---|
| 00 | R2 |
| 01 | O2 |
| 10 | A2 |
| 11 | M2 |

TABLE IV

| | S6 | S5 | S4 | S3 | S2 | S1 | LD1 | LD2 | LD3 | LD4 | |
|---|---|---|---|---|---|---|---|---|---|---|---|
| 1N | X | X | X | 1 | 1 | 1 | 1 | 0 | 0 | 0 | Transfer R1 to north PE's R1 |
| 1S | X | X | X | 1 | 1 | 0 | 1 | 0 | 0 | 0 | Transfer R1 to south PE's R1 |
| 1W | X | X | X | 1 | 0 | 1 | 1 | 0 | 0 | 0 | Transfer R1 to west PE's R1 |
| 1E | X | X | X | 1 | 0 | 0 | 1 | 0 | 0 | 0 | Transfer R1 to east PE's R1 |
| SP1 | X | X | X | 0 | 1 | 1 | 1 | 0 | 0 | 0 | Load PT to R1 |
| S21 | X | X | X | 0 | 0 | 0 | 1 | 0 | 0 | 0 | Shift R2 to R1 |
| S31 | X | X | X | 0 | 0 | 1 | 1 | 0 | 0 | 0 | Shift R3 to R1 |
| S41 | X | X | X | 0 | 1 | 0 | 1 | 0 | 0 | 0 | Shift R4 to R1 |
| S23 | X | X | X | X | X | X | X | 0 | 1 | 0 | Shift R2 to R3 |
| S34 | X | X | X | X | X | X | 0 | 0 | 0 | 1 | Shift R3 to R4 |
| S12 | 1 | 1 | 0 | X | X | X | 0 | 1 | 0 | 0 | Shift R1 to R2 |
| S121 | 1 | 1 | 0 | 0 | 0 | 0 | 1 | 1 | 0 | 0 | Swap R1 and R2 |
| S1231 | 1 | 1 | 0 | 0 | 0 | 1 | 1 | 1 | 1 | 0 | Rotate: R1 -> R2 -> R3 -> R1 |
| AND | 1 | 0 | 0 | X | X | X | 0 | 1 | 0 | 0 | AND R2 with R1 and store to DR2 |
| OR | 0 | 1 | 0 | X | X | X | 0 | 1 | 0 | 0 | OR R2 with R1 and write to DR2 |
| INV12 | 1 | 1 | 1 | X | X | X | 0 | 1 | 0 | 0 | Shift the inverted R1 to R2 |
| INV121 | 1 | 1 | 1 | 0 | 0 | 0 | 1 | 1 | 0 | 0 | Swap the Inverted R1 with R2 |

Table IV illustrates an example of a set of morphological processing operations, with particular values for the LOAD and SELECT signals set forth. The left-most column provides a code of the operation being performed. The right-most column provides an explanation of the operation. The exemplary set of commands illustrated in Table IV provide for a skeletonization of the image stored within the array processor.

As noted above, the LOAD signals and the SELECT signals are generated by the embedded array controller in response to commands received from the host computer. The commands generated by the host computer may be generated by a program configured to perform MIPL instructions. The method by which the host computer creates command signals and the method by which the embedded controller converts command signals to sets of particular LOAD and SELECT signals is that the embedded controller receives assembly code as defined in the left-most column of Table IV and, in response, generates a 10-bit binary code representative of SELECT line S1-S6 and LOAD lines LD1-LD4. It is contemplated that the configuration of the 10-bit binary code is directed to the logic circuitry of FIG. 4 and may be modified in accordance with any conventional hardware design, and software programming techniques.

Thus, FIGS. 1 through 4 illustrate an embodiment of the present invention having a morphological processing chip configured for receiving and processing morphological operation commands provided by a host computer. Once a sequence of commands are performed, the binary values stored within the various processing elements are electronically output to the host computer, through the array controller, for display on a CRT on a computer or for subsequent processing.

Figure 5:
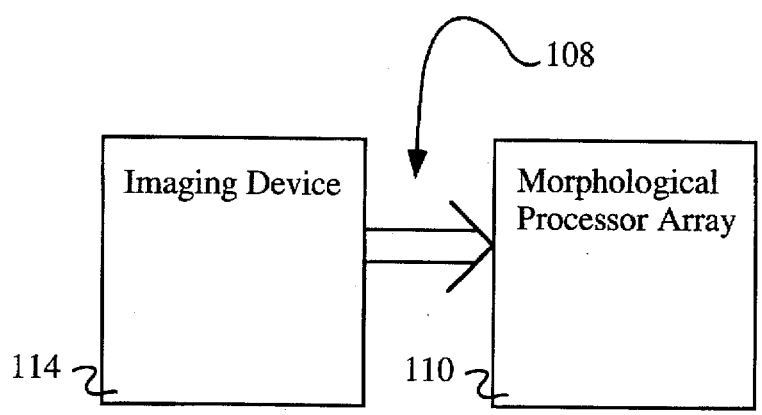
FIG. 5 is a block diagram illustrating an alternative embodiment of a morphological processing system configured in accordance with the invention which does not require a host computer and which includes an individual LCD output device.
Figure 6:
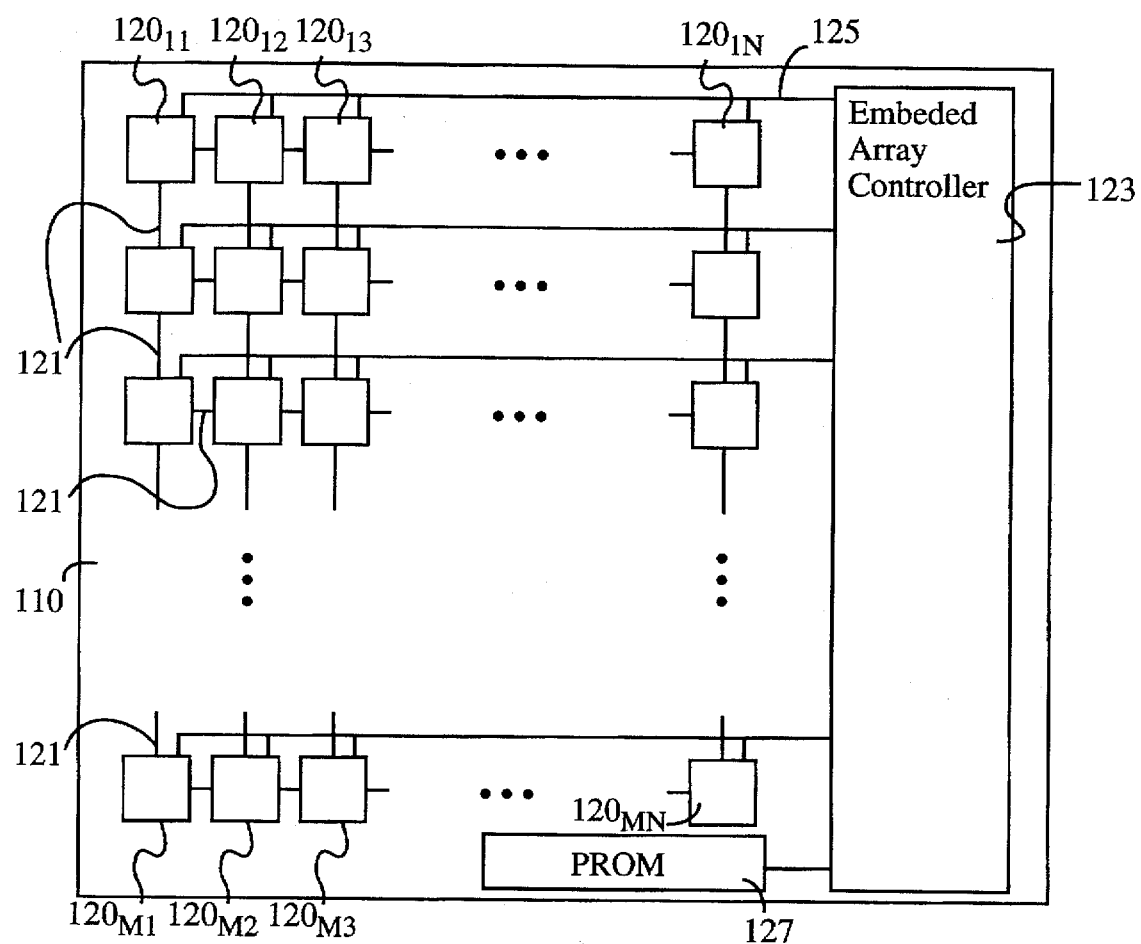
FIG. 6 is a block diagram illustrating the morphological processing chip of the alternative embodiment of FIG. 5.

FIG. 5 illustrates an embodiment of the array processor of the invention which does not require a host computer and does not require an electronic means for outputting pixels of a modified image. More specifically, FIG. 5 illustrates a processing system 108 having an imaging device 114 and a VLSI array processor chip 110. Processor array 110 includes a set of LCD optical output devices (not shown in FIG. 5) for outputting an optical image in response to pixel values stored within array 110. As with the embodiment of FIG. 1, processor chip 110 is positioned at a focal plane of imaging device 114 for detecting a two dimensional image. FIG. 6 illustrates processing chip 110 which includes a matrix of individual processing elements 120 interconnected by lines 121. Chip 110 also includes a embedded array controller 123, connected to each of the individual processing elements by lines 125, and a programmable read only memory (PROM) 127 which includes a set of stored morphological processing commands.

As can be seen from FIG. 6, no input/output line similar to line 22 of FIG. 2 is provided. An input line is not required since the chip of FIG. 5 performs a set of preprogrammed morphological operations and, hence, does not require commands from an external computer. An output line is not required since the chip includes an optical output device, described below. Although an input/output line is not required, certain RESET lines may be required for resetting each of the processing elements, i.e., for clearing an image stored therein. Also, although an optical output is provided, it may be desirable to include a redundant electrical output for verifying that optical output system operates properly. In this regard, additional hardware (not shown) may be provided for generating the reset signals and for electronically downloading pixel values to verify correct operation of the optical output device. Additionally, an optical output reading device may be provided for detecting optical images generated by the LCD displays. In other applications, no such output device is required. Rather, an operator may directly view an image displayed by the LCD elements of chip 110.

As noted, PROM 127 contains prerecorded processing commands which define a set of morphological processing operations. The commands stored within PROM 127 may be equivalent to a specific set of commands generated by the host computer of FIG. 2. If so, array controller 123 and individual elements 120 may be identical to corresponding elements described in FIGS. 1–4. As such, controller 123 merely receives commands from PROM 127 rather than from a host computer, and translates those commands into specific SELECT and LOAD signals. PROM 127 may form a part of embedded controller 123. Alternatively, PROM 127 may be configured to store the SELECT and LOAD signal values directly. In such an embodiment, array controller is not needed. Instead, PROM 127 is connected directly to the various individual elements 120. Even in such an embodiment, it may be desirable to provide an array controller at least for providing command strobe signals for synchronizing operation of the individual processing elements.

Figure 7:
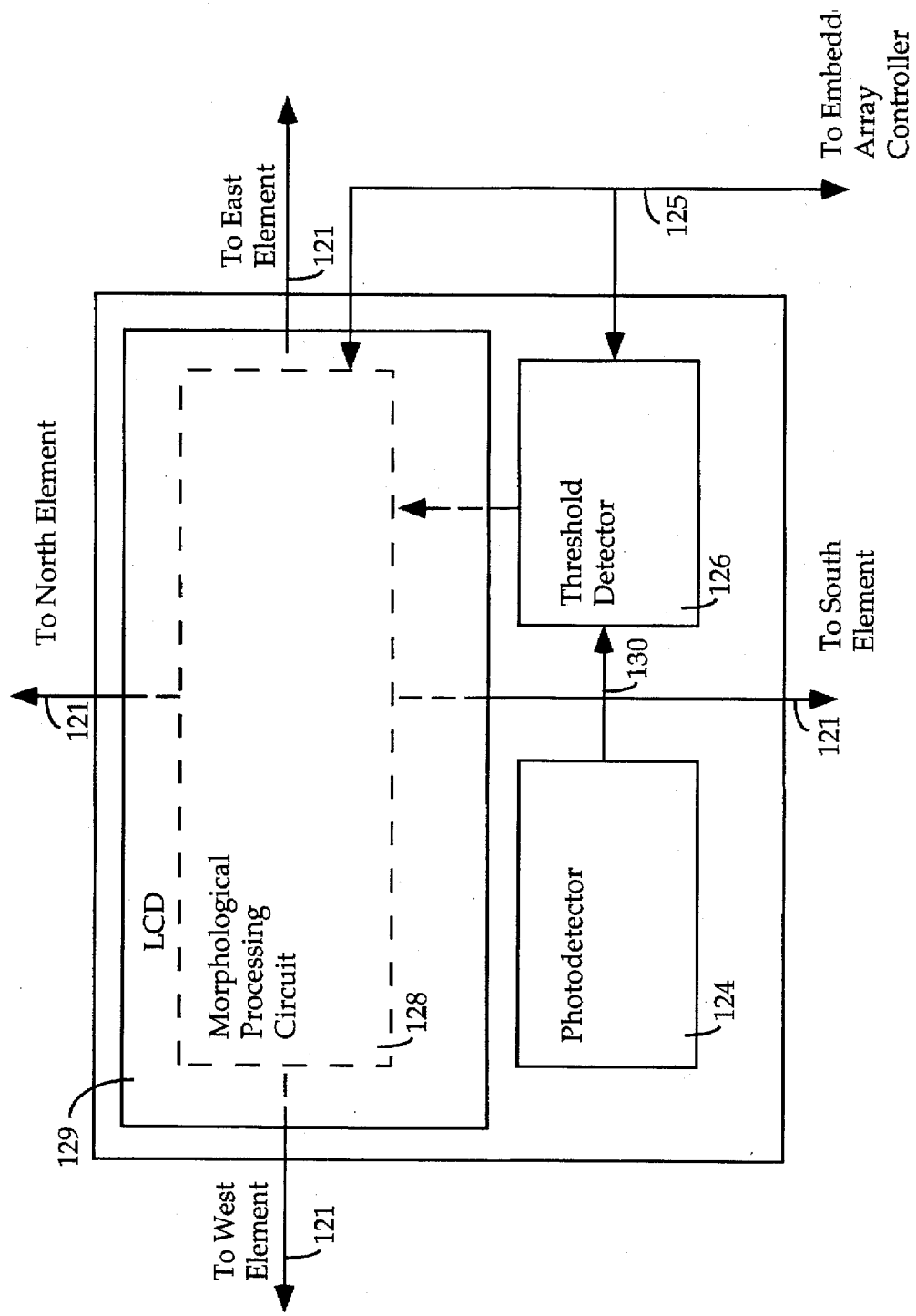
FIG. 7 is a block diagram illustrating an individual processing element of the alternative morphological processing chip of FIG. 6.

FIG. 7 illustrates an individual element 120 of processing chip 110. Processing element 120 includes a photo-detector 124, a threshold detector 126 and a processing circuit 128. A signal representative of the intensity of the incident light is transmitted from detector 124 to threshold detector 126. Threshold detector 126 generates a binary-valued signal in response to a preprogrammed threshold value. The signal is transmitted to processing element 128.

Processing element 128 is configured as set forth above in FIG. 5. As such, processor 128 is generally capable of performing an arbitrary set of operations. However, the particular sequence of operations to be performed by processing element 128 is limited to those stored within PROM 127 (FIG. 6). In yet another alternative embodiment, processing element 128 may be configured to perform only a specific sequence of bit operations in accordance with a predetermined set of morphological processing commands. In such an embodiment, PROM 127 (FIG. 6) is not needed since the processing commands are hard-wired directly into each of processing circuits 128.

In addition to the foregoing components, processing element 120 also includes an LCD output device 129. A binary value generated by processing circuit 128 is output to LCD device 129 which provides optical output of the binary value. More specifically, if the stored binary value is, for example, one, the LCD device is enabled to display a single pixel. If the binary value is, for example, zero, the LCD device is not enabled and thereby does not display the single pixel. In this manner, the binary value stored within the processing element is optically output by the LCD. With the LCD of each processing element operating simultaneously, an entire processed image is simultaneously output. As noted above, the array processor chip is configured using the VLSI techniques. Additional processing steps may be required to fabricate the LCD devices onto the VLSI chip. Preferably, the LCD device overlays a portion of the morphological processing circuit, as shown. Alternatively, the LCD device is mounted on an opposing side of the VLSI chip or on a seperate chip.

Figure 8:
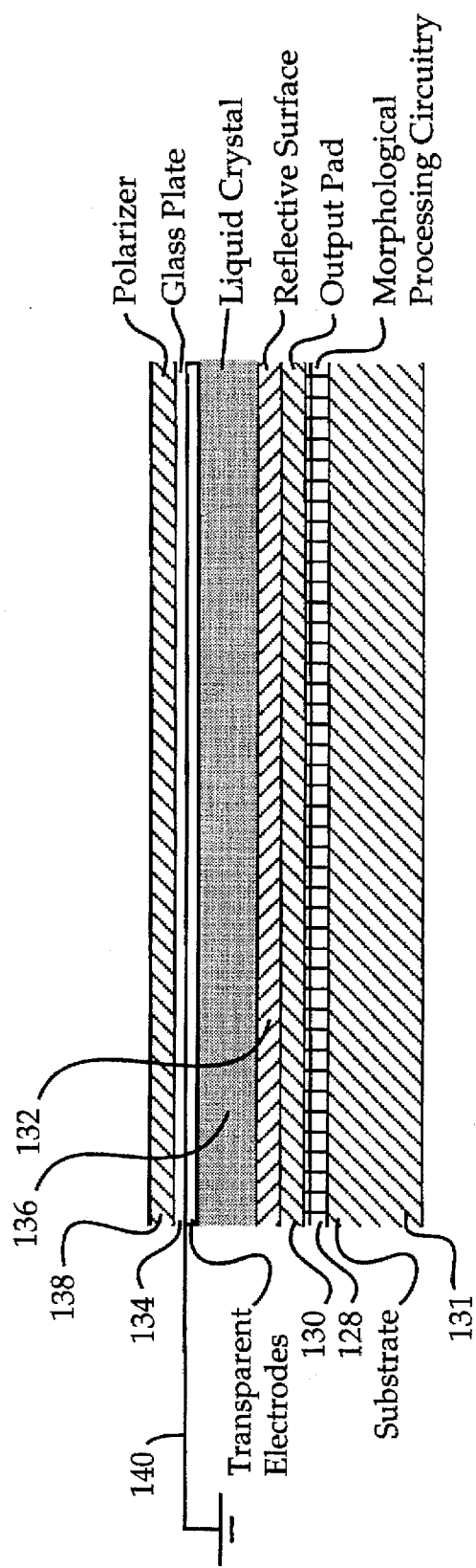
FIG. 8 is a schematic cross-section of a portion of the processing element of FIG. 7, particularly illustrating the structure of the LCD output device.

FIG. 8 provides a cross-sectional view of a portion a single element 120 of chip 110, specifically illustrating the structure of LCD 129. Processing circuit 128, mounted on a substrate 131, is connected to an output driver pad 130 which may either be on top of a portion of circuit 128, as shown, or adjacent to circuit 128. A reflective conducting material 132 is positioned above pad 130, (or immediately above both circuit 128 and pad 130 if positioned adjacent.) The pad itself may have a reflective top surface. A glass plate 134 is positioned above, and offset from, reflective material 132. A space between plate 134 and reflective material 132 is filled with a liquid crystal material 136. Side walls necessary for containing the liquid crystal material are, for clarity, not illustrated in FIG. 8. A polarizer 138 is mounted above glass plate 134 to control the polarization of light passing into, and out of, the liquid crystal. Transparent electrodes 140 are positioned within glass plate 134 in contact with the liquid crystal. Electrode 140 is grounded (as shown schematically). A voltage difference is placed across the liquid crystal by applying a voltage through pad 130 to reflective conducting material 132. The voltage difference determines whether the liquid crystal material is absorptive or not. If absorptive, incoming light received from a remote source (not shown) is absorbed yielding a darkened pixel. If the liquid crystal material is not absorptive, then light received through glass polarize 140 and glass plate 136 is reflected from reflective material 132, thereby yielding a non-darkened pixel.

Preferably, LCD 129 extends over a large portion of element 120, excluding photodetector 124. As noted, above, in an alternative embodiment, LCD 129 is positioned on an opposite side of chip 110 from processing circuitry 128, with electrical interconnections provided through the substrate of chip 110. In such an embodiment, each LCD 129 may be as large as each processing element 120. As can be appreciated, various other embodiments may be provided in accordance with the invention.

A processing chip in accordance with the invention may be configured to any of a variety of sizes and shapes, conventional MOSIS 2-micrometer CMOS fabrication presses may be employed. Sub-micron CMOS technology may be employed to provide a high density of processing elements.

The morphological processing chips of the invention may be employed in connection with any of a variety of convention morphological processing applications including the preprocessing of images to remove noise and clutter. The chip is particularly well suited also for skeletonizing an image to allowing subsequent template matching to other skeletonized images. Conventional template matching techniques may be employed in this regard.

What has been described is an apparatus for performing morphological image processing having a grid of individual processing elements formed on a VLSI chip. Each element of the grid includes a photo-detector for directly sensing a pixel of an input image. Processing circuitry manipulates pixels, either in accordance with pre-programmed commands, or in accordance with commands received from an external source to process the input image. Once modified, the image may be output electronically or, in one embodiment, output optically using LCD's. By configuring the processor as a VLSI array, high speed morphological processing is achieved.

Other objects and advantages of the invention will be apparent to those persons of ordinary skill in the art from the foregoing description. Although the invention is illustrated in terms of certain exemplary embodiments, the scope of the invention is not limited to those embodiments. Numerous alternative configurations may be provided in accordance with the general principles of the invention.

What is claimed is:

1. A morphological array processor system that processes an image in real-time, comprising:
   a plurality of processing elements, each processing element including
   photo-detector means for detecting light associated with at least one selected pixel of the image and generating a signal having a value representative of an amount of light detected,
   morphological processing means, connected to said photo-detection means and each of a plurality of adjacent processing elements, for storing said value and for performing a selected morphological operation on said value in accordance with (i) prior stored values of said selected pixel as measured by the processing element and (ii) neighboring values stored by each of said plurality of adjacent processing elements, and
   output means for generating an output signal representative of said value, said output means being connected to said morphological processing means; and
   controller means for receiving selected morphological processing commands and translating the selected morphological processing commands into command signals utilized by said morphological processing means in order to perform said selected morphological operation, said controller means being connected to each of said plurality of processing elements.

2. The morphological array processor system at claim 1, wherein each output means is an optical output device being at least one of a liquid-crystal diode device and an electrical output device.

3. The morphological array processor system of claim 1, wherein said morphological processing means includes a plurality of multiplexers and a plurality of flip-flops interconnected together to perform the selected morphological operation.

4. The morphological array processor system of claim 3, wherein said command signals produced by said controller means include a plurality of select signals selecting outputs for the plurality of multiplexers and a plurality of loads signals to control temporary storage by said plurality of flip-flops.

5. The morphological array processor system of claim 1, wherein each of said plurality of processing elements further includes threshold detection means, connected to said photo-detector means, said morphological processing means and said controller means, for determining whether said signal exceeds a predetermined threshold and for transmitting said signal to said morphological processing means, said signal having a first value for signals exceeding said threshold and a second value for signals not exceeding said threshold.

6. A morphological array processor system that processes an image in real-time, comprising:
   a plurality of processing elements, each processing element including
   a photo-detector that detects light associated with at least one selected pixel of the image and generates a signal in response thereto,
   a threshold detection circuit connected to said photo-detector, said threshold detection circuit determines whether said signal generated by said photo-detector exceeds a predetermined threshold and transmits a binary signal having a value to a morphological processor circuit, wherein said value being a first value if said signal exceeds said predetermined threshold and a second value if said signal is less than said predetermined threshold,
   the morphological processor circuit connected to said photo-detector and to each of a plurality of adjacent processing elements processing pixels adjacent to said selected pixel, said morphological processor circuit receives said value in response to an amount of light detected by said photo-detector and performs a selected morphological operation to said value based on (i) prior stored values of the selected pixel as measured by the processing element and (ii) neighboring values stored by each of said plurality of adjacent processing elements, and
   an output device connected to said morphological processor circuit, said output device generates an output signal representative of said value; and
   an embedded controller connected to each of said plurality of processor elements, said embedded controller receives selected morphological processing commands and translates the selected morphological processing commands into command signals for use by said morphological processor circuit in controlling a data flow of said value, said prior values and said neighboring values through said morphological processor circuit in order to perform said selected morphological operation.

7. The morphological array processor system of claim 6, wherein each output device is one of (i) an electrical output device and (ii) a liquid crystal diode, connected to a corresponding morphological processing circuit, said liquid crystal diode generating an optical signal in response to said value stored in said corresponding processing circuit.

8. The morphological array processor system of claim 6, wherein the morphological processing circuit includes a plurality of multiplexers controlled by at least one command signal from the embedded controller and a plurality of flip-flops controlled by at least one command signal from the embedded controller.

9. A morphological array processor system, comprising:
   a plurality of processing elements, each including
   a photo-detector detecting light and generating a signal in response thereto,
   a morphological processor circuit, connected to said photo-detector and to each of a plurality of adjacent processing elements, said morphological processor circuit storing a value in response to an amount of light detected by said photo-detector and performing morphological processing of said stored value in accordance with selected morphological operations and in accordance with the values stored by each of said plurality of adjacent processing elements, said morphological processor circuit includes
   a first multiplexer receiving said binary signal from said threshold detection circuit, binary signals from adjacent processing elements, and command signals from a command processor,
   a first D flip-flop having a D input connected to an output of said first multiplexer and having a clock input receiving a first LOAD signal from said command processor, a second multiplexer having first and second inputs connected to outputs of said first D flip-flop and a third input receiving a fourth SELECT signal from said command processor, an AND gate having a first input connected to an output of said second multiplexer and having a second input connected to the output of a second D flip-flop, an OR Gate having a first input connected to the output of the second single bit storage device and a second input connected to the output of the second multiplexer, a third multiplexer having first, second, third and fourth inputs, connected to outputs of said second multiplexer, said AND gate, said OR gate, and said second D flip flop respectively, and having fourth and fifth inputs receiving fifth and sixth SELECT signals from said command processor, said second D flip flop having a D input connected to an output of said third multiplexer and an enable input connected receiving a second LOAD signal from said command processor, a third D flip flop having a D input connected to an output of said second D flip flop and an enable input receiving a third LOAD signal from said command processor, a fourth D flip flop having a D input connected to an output of said third D flip flop and an enable input receiving a third LOAD signal from said command processor, and said outputs of said second, third and fourth single bit storage devices also being connected to inputs of said first multiplexer, a threshold detection circuit connected to said morphological processor, said threshold detection circuit determines whether said signal generated by said photo-detector exceeds a predetermined threshold and transmits a binary signal to said morphological processor circuit having a first value for signals exceeding said threshold and a second value for signals not exceeding said threshold, and an output device connected to said morphological processor circuit, said output device generates an output signal representative of said stored value.

10. A method for use in performing morphological processing of an image using an array processor having a plurality of processing elements, each processing element including a photo-detector and a processing circuit, said method comprising the steps of:

detecting an amount of incident light at each processing element using said photo-detectors;

storing a value at each processing element representative of an amount of light detected;

receiving a sequence of identical command signals at each processing element, said sequence of identical command signals being translated from a selected morphological processing command;

performing a sequence of identical processing operations at each processing element in accordance with the sequence of received command signals, said operations modifying each stored value of each respective processing element based on (i) a previously stored value of the respective processing element and (ii) stored values stored in adjacent processing elements; and outputting signals representative of said stored values of said processing elements after performing the sequence of processing operations, said output signals being representative of a modified image.

11. The method of claim 10, wherein said step of outputting signals comprises the steps of transmitting signals to a plurality of LCD elements, said plurality of LCD elements displaying a representation of said modified image in response to said signals.

* * * * *